(12) United States Patent
Nakagawa et al.

(10) Patent No.: US 11,186,737 B2
(45) Date of Patent: Nov. 30, 2021

(54) INK AND PRINTING METHOD

(71) Applicant: RICOH COMPANY, LTD., Tokyo (JP)

(72) Inventors: Tomohiro Nakagawa, Kanagawa (JP); Hiroki Hagiwara, Kanagawa (JP); Yuutaroh Nonaka, Kanagawa (JP); Kazuhiko Umemura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/888,903

(22) Filed: Jun. 1, 2020

(65) Prior Publication Data
US 2020/0385592 A1 Dec. 10, 2020

(30) Foreign Application Priority Data

Jun. 5, 2019 (JP) .............................. JP2019-105437
Nov. 11, 2019 (JP) .............................. JP2019-203735

(51) Int. Cl.
*C09D 11/322* (2014.01)
*B41M 5/00* (2006.01)
(Continued)

(52) U.S. Cl.
CPC .............. *C09D 11/322* (2013.01); *B41J 2/01* (2013.01); *B41J 2/2107* (2013.01);
(Continued)

(58) Field of Classification Search
CPC ... C09D 11/107; C09D 11/322; C09D 11/101; C09D 11/326; C09D 11/38; C09D 11/36;
(Continued)

(56) References Cited

U.S. PATENT DOCUMENTS

2012/0052256 A1* 3/2012 Nakamura ........... C09D 11/101
428/195.1
2012/0200653 A1* 8/2012 Shimohara ............. B41J 2/2107
347/102
(Continued)

FOREIGN PATENT DOCUMENTS

JP 2007-533802 11/2007
JP 2010-195906 A 9/2010
(Continued)

OTHER PUBLICATIONS

U.S. Appl. No. 16/794,317, filed Feb. 19, 2020 Hiroki Hagiwara, et al.
(Continued)

*Primary Examiner* — Manish S Shah
(74) *Attorney, Agent, or Firm* — Grüneberg and Myers PLLC

(57) ABSTRACT

An ink includes water, a compound represented by the following Chemical formula 1, Pigment Red 269 represented by the following Chemical formula 2, and alkylene glycol alkyl ether, wherein the proportion of the compound represented by the following Chemical formula 1 in a total amount of the Pigment Red 269 is 2 or less percent by mass.

Chemical formula 1

(Continued)

-continued

Chemical formula 2

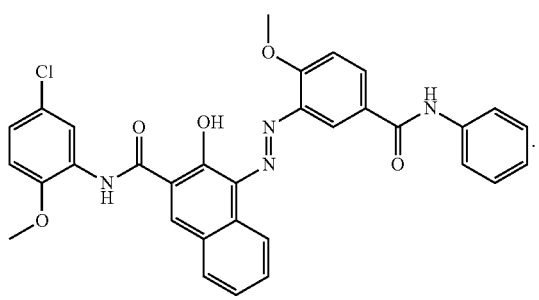

13 Claims, 1 Drawing Sheet

(51) Int. Cl.
| | |
|---|---|
| *C09B 29/28* | (2006.01) |
| *C09D 11/033* | (2014.01) |
| *C09D 11/037* | (2014.01) |
| *C09D 11/38* | (2014.01) |
| *D06P 5/30* | (2006.01) |
| *D21H 19/42* | (2006.01) |
| *D21H 19/46* | (2006.01) |
| *B41J 2/21* | (2006.01) |
| *B41J 2/01* | (2006.01) |

(52) U.S. Cl.
CPC ............ *B41M 5/0023* (2013.01); *C09B 29/28* (2013.01); *C09D 11/033* (2013.01); *C09D 11/037* (2013.01); *C09D 11/38* (2013.01); *D06P 5/30* (2013.01); *D21H 19/42* (2013.01); *D21H 19/46* (2013.01)

(58) Field of Classification Search
CPC ......... C09D 11/40; C09D 11/30; C09D 11/32; C09D 11/324; C09D 11/328; C09D 11/102; C09D 11/005; C09D 11/54; C09D 11/52; C09D 11/106; C09D 11/03; C09D 11/037; C09D 11/033; C09D 151/08; B41J 11/0021; B41J 2/2107; B41J 2/01; B41J 11/002; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 11/00; B41M 5/0023; B41M 7/0081; B41M 3/006; B41M 3/003; B41M 5/0011; B41M 5/0017; B41M 5/0047; B41M 7/00; B41M 7/0072; B41M 5/52; B41M 5/5218; B41M 5/5227; B41M 5/0076; G02B 5/20; G02B 5/223; C08K 3/11; C08K 2203/2237; C14C 11/006
See application file for complete search history.

(56) References Cited

U.S. PATENT DOCUMENTS

| | | | |
|---|---|---|---|
| 2012/0213978 A1* | 8/2012 | Hironaka ............... | C09D 11/38 428/195.1 |
| 2013/0027478 A1* | 1/2013 | Kozee ................... | C09D 11/322 347/73 |
| 2013/0209695 A1* | 8/2013 | Fukagawa ............. | C09D 11/322 427/379 |
| 2014/0313268 A1* | 10/2014 | Nakano ................ | B41J 11/0015 347/102 |
| 2015/0132544 A1* | 5/2015 | Kano ..................... | C09D 11/30 428/195.1 |
| 2019/0389231 A1 | 12/2019 | Kaji et al. | |
| 2020/0095444 A1 | 3/2020 | Hagiwara et al. | |

FOREIGN PATENT DOCUMENTS

| | | |
|---|---|---|
| JP | 2012-184334 A | 9/2012 |
| JP | 2016-108452 | 6/2016 |
| JP | 2020-001216 | 1/2020 |
| WO | WO2005/105928 A1 | 11/2005 |
| WO | WO 2012/176255 A1 | 12/2012 |

OTHER PUBLICATIONS

Extended European Search Report dated Nov. 9, 2020 in European Patent Application No. 20177890.9, citing documents AO through AQ therein, 6 pages.

* cited by examiner

INK AND PRINTING METHOD

CROSS-REFERENCE TO RELATED APPLICATIONS

This patent application is based on and claims priority pursuant to 35 U.S.C. § 119 to Japanese Patent Application Nos. 2019-105437 and 2019-203735 filed on Jun. 5, 2019 and Nov. 11, 2019, respectively, in the Japan Patent Office, the entire disclosures of which are hereby incorporated by reference herein.

BACKGROUND

Technical Field

The present invention relates to an ink and a printing method.

Description of the Related Art

Since inkjet printers are relatively quiet, have low running costs, and are capable of printing color images with ease, they are now widely used at home to output digital information.

Inkjet technologies for forming images on various substrates such as cloth, plastic film, and hard materials are developed and applied for industrial settings as well as home settings.

The widening range of such applications has spurred demand for ink for achieving higher image quality.

One such application is a quinacridone-based pigment represented by Pigment Red (PR) 122 for magenta ink. Such quinacridone-based pigments have excellent durability but are expensive, are available in few varieties, and suffer poor color developability. Naphthol Red pigment, in contrast, is appealing because it is inexpensive and available in many varieties. In particular, PR269 has an excellent color developability.

SUMMARY

According to embodiments of the present disclosure, an ink is provided which includes water, a compound represented by the following Chemical formula 1, Pigment Red 269 represented by the following Chemical formula 2, and alkylene glycol alkyl ether, wherein the proportion of the compound represented by the following Chemical formula 1 in the total amount of the Pigment Red 269 is 2 or less percent by mass.

Chemical formula 1

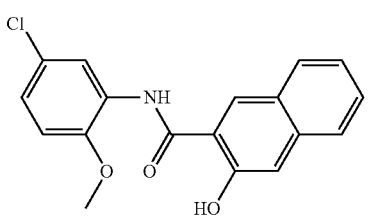

Chemical formula 2

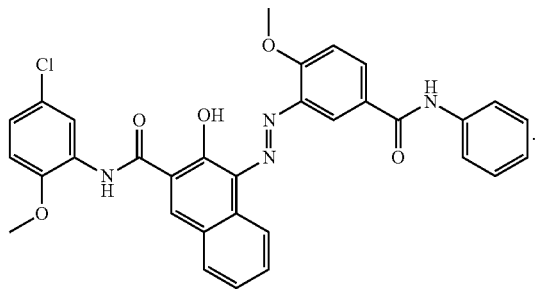

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
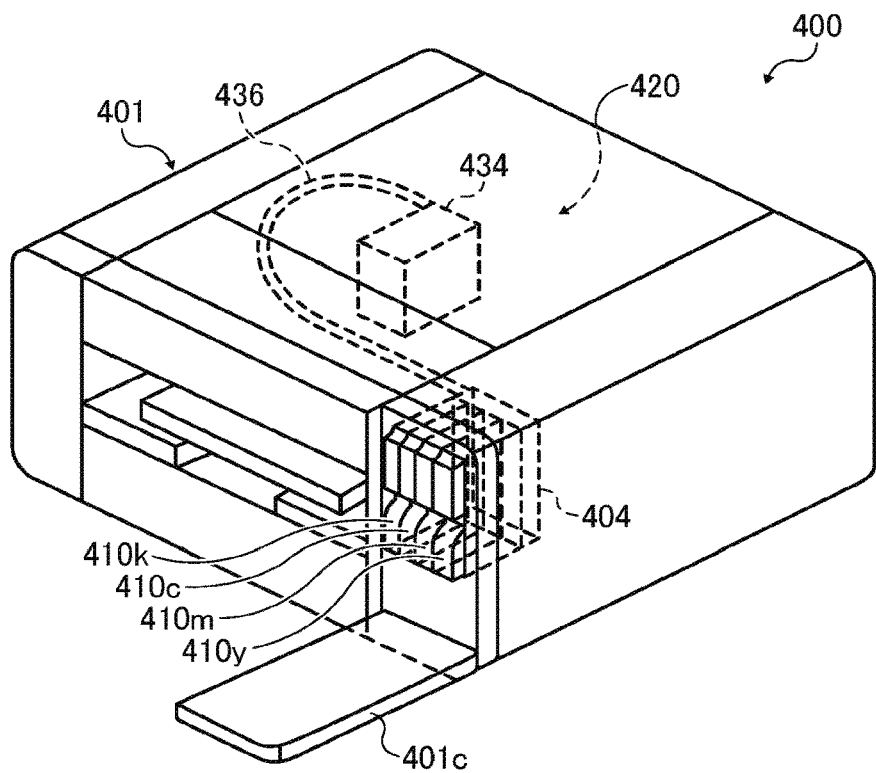
FIG. 1 is a diagram illustrating a perspective view of an example of an inkjet recording device.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

An aqueous dispersion using PR269 is proposed in JP-2016-108452-A1.

However, it discloses only the dispersion of PR269 but does not mention or disclose properties of ink formulated based on PR269.

In general, alkylene glycol alkyl ether is added to inkjet ink as a hydrophobic solvent so as to prevent the inkjet ink from spreading over substrates. However, PR269 readily dissolves in solvents, meaning that PR269 has poor storage stability when used in combination with alkylene glycol alkyl ether, which is the reason PR269 is often not selected.

According to the present disclosure, provided is an ink containing PR269 having sufficient storage stability to which even alkylene glycol alkyl ether is added.

The ink of the present disclosure will be described below in detail with reference to several embodiments and accompanying drawings.

An embodiment of the present disclosure is that (1). An ink contain water; a compound represented by the following Chemical formula 1, Pigment Red 269 represented by the following Chemical formula 2, and alkylene glycol alkyl ether, wherein the proportion of the compound represented by the following Chemical formula 1 in a total amount of the Pigment Red 269 is 2 or less percent by mass.

Chemical formula 1

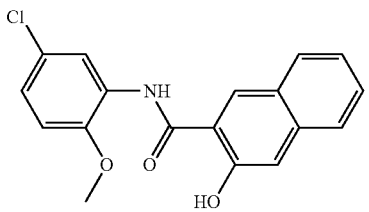

Chemical formula 2

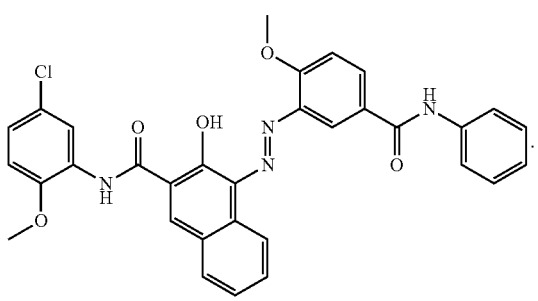

This embodiment of the present disclosure includes the (2) to (8) below. Therefore, these are also described.

(2): The ink according to (1) mentioned above, wherein the proportion of Pigment Red 269 of the total amount of the ink is from 3 to 7 percent by mass.

(3): The ink according to (1) or (2) mentioned above, wherein the proportion of the compound represented by the following Chemical formula 1 to the total amount of Pigment Red 269 is 1 or less percent by mass.

(4): The ink according to any one of (1) to (3) mentioned above, wherein the proportion of alkylene glycol alkyl ether of the total amount of the ink is from 3 to 15 percent by mass.

(5): A printing method includes applying the ink of any one of (1) to (4) mentioned above to a substrate.

(6): The printing method according to (5) mentioned above, wherein the substrate includes a soft packaging substrate.

(7): The printing method according to (6) mentioned above, wherein the soft packaging substrate includes a transparent film.

(8): The aqueous ink according to (5) mentioned above, wherein the coloring material is a pigment.

Having investigated the storage stability of ink containing PR269, the present inventors formulated an ink containing PR269 with alkylene glycol alkyl ether that remains stable if the proportion of the compound represented by the Chemical Formula 1 as illustrated above as a starting material of PR269 (hereinafter referred to as naphthol AS-CA) remaining in the ink is small.

Although the reason for this stability is not clear, because naphthol AS-CA as a starting material partially matches the structure of PR269, unreacted naphthol AS-CA may be readily adsorbed to PR269, thereby inhibiting the adsorption of the dispersant used.

(Dispersant Adsorption Tends to Cause Dispersion Breakdown of PR269 in the Presence of a Solvent.)

In contrast, the ink of the present disclosure contains naphthol AS-CA in a proportion of 2 or less percent by mass of PR269 so that such dispersion breakdown is prevented.

In addition, naphthol AS-CA has skin sensitization potential. However, when the proportion of this compound in the ink is sufficiently small, the ink film produced with the ink does not cause allergies. Therefore, the ink of the present disclosure could be used to print to cloth such as that of T-shirts that directly contact the skin.

The ink of the present disclosure preferably contains PR269 in a proportion of 3 to 7 percent by mass of the total amount of the ink. Ink containing PR269 in this range exhibits particularly excellent storage stability.

The proportion of PR269 is more preferably from 3.5 to 6 percent by mass.

The ink of the present disclosure contains naphthol AS-CA in a proportion of 2 or less percent by mass and preferably 1 or less percent by mass of Pigment Red 269 so that the ink lacks skin sensitization potential and can be applied to textile printing such as printing onto cloth substrate of fabrics.

The ink of the present disclosure preferably contains alkylene glycol alkyl ether in a proportion of 3 to 15 percent by mass of the total amount of the ink, which exhibits particularly excellent storage stability. The proportion of alkylene glycol alkyl ether is more preferably from 5 to 12 percent by mass.

The ink of the present disclosure is suitably applied to soft packaging substrate such as plastic film. The ink of the present disclosure demonstrates excellent coloring so that it can be suitably applied to a substance such as plastic transparent film.

The ink of the present disclosure has excellent drying property and fixability so that even when the ink is applied to a substrate such as corrugated board having a high surface roughness in comparison with plain paper, resulting printed products have a high image density with a high level of coloring. The ink containing the compound represented by Chemical Formula 1 in a proportion of 2 or less percent by mass of Pigment Red 269 represented by Chemical Formula 2 is inferred to make affinity between pigment Red 269 and the resin higher, which causes the coloring material to stay on the surface of a corrugated board, resulting in printing with excellent image density and coloring property.

When a corrugated board is used as a substrate, image density and coloring property can be further enhanced by applying a processing fluid before image forming. Moreover, it is possible to furthermore enhance image density and coloring property by drying the processing fluid on the corrugated board before printing.

Ink

The ink of the present disclosure contains at least water, naphthol AS-CA, PR269 as coloring material, and alkylene glycol alkyl ether.

Water

The proportion of water of the ink is not particularly limited and can be suitably selected to suit to a particular application. For example, in terms of enhancing the drying property and discharging reliability of the ink, the proportion is preferably from 10 to 90 percent by mass and more preferably from 20 to 60 percent by mass.

PR269

In the present disclosure, PR269 contains a small amount of naphthol AS-CA. Specifically, the proportion of naphthol AS-CA of PR269 is 2 percent by mass and preferably 1 percent by mass.

PR269 is available on the market and can be synthesized.

PR269 can be synthesized by any known method, specifically by the following method.

First, 3-amino-4-methoxy benzanilide is diazotized using sodium nitrite so that diazotized liquid is prepared. This diazotized liquid is mixed with a separately prepared reacting liquid containing naphthol AS-CA as coupling component to allow coupling reaction, thereby producing PR269.

Subsequent to filtering the mixture containing the resulting PR269, the residue is rinsed with water followed by dehydration to obtain a press cake. After the press cake is dried, the resulting dry block is pulverized so that powdery PR269 is obtained.

The resulting PR269 is refined by any known refining method.

Specifically, there are a method of removing impurities by repeating stirring and filtering with pure water, a method of refining by diafiltration using ultrafiltration membrane, and a refining method using a soxhlet extractor.

Such refining methods adjust the proportion of naphthol AS-CA of PR269 to 2 or less percent by mass.

In the present disclosure, it is preferable that PR269 dispersed in water be added when ink is manufactured.

To disperse a pigment in ink, for example, there are a method of introducing a hydrophilic functional group into the pigment to prepare a self-dispersible pigment, a method of coating the surface of the pigment with a resin, or a method of using a dispersant.

To introduce a hydrophilic group into a pigment to make a pigment self-dispersible, it is possible to add a functional group such as a sulfone group and a carboxyl group to a pigment (e.g., carbon) to make the pigment dispersible in water.

To disperse a pigment by coating the surface of the pigment with a resin, the pigment is encapsulated into a microcapsule to allow the pigment dispersible in water. This can be referred to as a resin-coated pigment. In this case, all the pigments to be added to ink are not necessarily entirely coated with a resin. Pigments partially or entirely uncovered with a resin are allowed to be dispersed in the ink unless such pigments have an adverse impact.

When a dispersant is used, a known dispersant having a small or large molecular weight represented by a surfactant is used.

Those can be used alone or in combination.

Alkylene Glycol Alkyl Ether

The ink of the present disclosure contains alkylene glycol alkyl ether, which is a solvent represented by the following Chemical Formula 3.

R1-(OR2)$n$-O—R3

The symbol "n" represents an integer of from 1 to 4.

R1 represents an alkyl group having one to eight carbon atoms that may be branched. R2 represents an alkylene group having one to four carbon atoms that may be branched. R3 represents a hydrogen atom or an alkyl group having one to four carbon atoms that may be branched Specific examples of the solvent represented by Chemical Formula 3 the ink of the present disclosure may contain include, but are not limited to, alkylene glycol monoalkyl ethers such as ethylene glycol mono-n-butyl ether, ethylene glycol mono-isobutyl ether, ethylene glycol mono-t-butyl ether, ethylene glycol mono-2-ethylhexyl ether, di ethylene glycol monomethyl (or ethyl, propyl, isopropyl, n-butyl, isobutyl, t-butyl, 2-ethylhexyl) ether, triethylene glycol monomethyl (or ethyl, propyl, isopropyl, n-butyl, isobutyl, t-butyl, 2-ethylhexyl) ether, tetraethylene glycol monomethyl ether, propylene glycol monopropyl ether, propylene glycol mono-n-butyl ether, propylene glycol mono-isobutyl ether, propylene glycol mono-t-butyl ether, propylene glycol mono-2-ethylhexyl ether, dipropylene glycol monomethyl (or ethyl, propyl, isopropyl, n-butyl, isobutyl, t-butyl, 2-ethylhexyl) ether, tripropylene glycol monomethyl (or ethyl, propyl, isopropyl, n-butyl, isobutyl, t-butyl) ether, and tetrapropylene glycol monomethyl ether, dialkylethers of polyhydric alcohols such as ethylene glycol dibutyl ether, ethylene glycol dipropyl ether, diethylene glycol dimethyl ether, diethylene glycol diethyl ether, diethylene glycol ethyl methyl ether, diethylene glycol dipropyl ether, diethylene glycol propyl methyl ether, diethylene glycol dibutyl ether, diethylene glycol butyl methyl ether, diethylene glycol butyl ethyl ether, diethylene glycol methyl-2-ethylhexyl ether, triethylene glycol dimethyl ether, triethylene glycol diethyl ether, triethylene glycol ethyl methyl ether, tetraethylene glycol dimethyl ether, tetraethylene glycol diethyl ether, tetraethylene glycol ethyl methyl ether, propylene glycol diethyl ether, propylene glycol ethyl methyl ether, propylene glycol methyl propyl ether, propylene glycol methyl butyl ether, propylene glycol methyl-2-ethylhexyl ether, dipropylene glycol dimethyl ether, dipropylene glycol diethyl ether, dipropylene glycol ethyl methyl ether, dipropylene glycol methyl propyl ether, dipropylene glycol dipropyl ether, tripropylene glycol dimethyl ether, tripropylene glycol diethyl ether, and tripropylene glycol ethyl methyl ether. Also, these can be used alone or mixed.

Of these, preferred are diethylene glycol dimethyl ether, diethylene glycol diethyl ether, diethylene glycol ethyl methyl ether, diethylene glycol dipropyl ether, diethylene glycol propyl methyl ether, diethylene glycol monobutyl ether, r, propylene glycol methyl ether, propylene glycol ethyl ether, propylediethylene glycol dibutyl ether, diethylene glycol butyl methyl ether, diethylene glycol butyl ethyl ether, diethylene glycol methyl-2-ethylhexyl ether, propylene glycol methyl ether, propylene glycol ethyl ether, propylene glycol propyl ether, propylene glycol diethyl ether, propylene glycol ethyl methyl ether, propylene glycol methyl propyl ether, propylene glycol methyl butyl ether, and propylene glycol methyl-2-ethylhexyl ether in terms of permeability into a substrate to which ink is discharged and leveling property and drying property of ink on the surface of a substrate.

Water Soluble Organic Solvent

A water-soluble organic solvent may be separately added to the ink of the present disclosure in addition to alkylene glycol alkyl ether.

There is no specific limitation to the organic solvent for use in the present disclosure. For example, a water-soluble organic solvent can be used. Examples include, but are not limited to, polyols, ethers such as polyol alkylethers and polyol arylethers, nitrogen-containing heterocyclic compounds, amides, amines, and sulfur-containing compounds.

Specific examples include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate.

It is preferable to use an organic solvent having a boiling point of 250 or lower degrees C., which serves as a humectant and imparts a good drying property at the same time.

In particular, it is preferable to contain at least one type of polyol in terms of securing discharging stability of an inkjet head. It is particularly preferable to use one of 1,2-propane diol, 1,2-butanediol, and 2,3-butanediol.

The ink of the present disclosure may include a surfactant to suitably secure wettability to a substrate and resin particles to enhance fastness.

Surfactant

Examples of the surfactant include, but are not limited to, silicone-based surfactants, fluorochemical surfactants, amphoteric surfactants, nonionic surfactants, and anionic surfactants.

The silicone-based surfactant has no specific limit and can be suitably selected to suit to a particular application. Of these, surfactants not soluble in a high pH environment are preferable. Examples of the silicone-based surfactants include, but are not limited to, side chain modified polydimethyl siloxane, both terminal-modified polydimethyl siloxane, one-terminal-modified polydimethyl siloxane, and side-chain-both-terminal-modified polydimethyl siloxane. Silicone-based surfactants having a polyoxyethylene group or a polyoxyethylene polyoxypropylene group as a modification group are particularly preferable because such an aqueous surfactant demonstrates good properties. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not readily produce foams.

Specific examples of the perfluoroalkyl sulfonic acid compounds include, but are not limited to, perfluoroalkyl sulfonic acid and salts of perfluoroalkyl sulfonic acid. Specific examples of the perfluoroalkyl carbonic acid compounds include, but are not limited to, perfluoroalkyl carbonic acid and salts of perfluoroalkyl carbonic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the ampholytic surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The proportion of the surfactant in the ink is not particularly limited and can be suitably selected to suit to a particular application. For example, the proportion is preferably from 0.001 to 5 percent by mass and more preferably from 0.05 to 5 percent by mass in terms of excellent wettability and discharging stability and improvement on image quality.

Resin

The type of the resin contained in the ink has no particular limit and can be suitably selected to suit to a particular application. Examples include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Resin particles made of such resins can be also used. It is possible to mix a resin emulsion in which such resin particles are dispersed in water as a dispersion medium with materials such as a coloring material and an organic solvent to obtain an ink. It is possible to use suitably-synthesized resin particles as the resin particle. Alternatively, the resin particle available on the market can be used. These resin particles can be used alone or in combination.

The mean volume diameter of the resin particle is not particularly limited and can be suitably selected to suit to a particular application. The mean volume diameter is preferably from 10 to 1,000 nm, more preferably from 10 to 200 nm, and particularly preferably from 10 to 100 nm to obtain good fixability and image robustness.

The volume average particle diameter can be measured by using, for example, a particle size analyzer (Nanotrac Wave-UT151, manufactured by MicrotracBEL Corp.).

The proportion of the resin in the ink is not particularly limited and can be suitably selected to suit to a particular application. In terms of fixability and storage stability of the ink, it is preferably from 1 to 30 percent by mass and more preferably from 5 to 20 percent by mass of the total amount of the ink.

Examples of other additives that can be minimally added include, but are not limited to, defoaming agents, preservatives and fungicides, and corrosion inhibitors.

Defoaming Agent

The defoaming agent has no particular limit and examples thereof include, but are not limited to silicon-based defoaming agents, polyether-based defoaming agents, and aliphatic acid ester-based defoaming agents. These can be used alone or in combination. Of these, silicone-based defoaming agents are preferable in terms of the effect of breaking foams.

Preservatives and Fungicides

The preservatives and fungicides are not particularly limited. A specific example is 1,2-benzisothiazoline-3-one.

Corrosion Inhibitor

The corrosion inhibitor has no particular limitation. Examples are acid sulfites and sodium thiosulfates.

The ink of the present disclosure is manufactured by dispersing or dissolving the ink composition mentioned above in an aqueous medium followed by optional mixing and stirring.

Typically, devices such as a stirrer using a stirring blade, a magnetic stirrer, and a high performance disperser can be used for the mixing and stirring.

Properties of the ink are not particularly limited and can be suitably selected to suit to a particular application. For example, viscosity, surface tension, and pH are preferable in the following ranges.

Viscosity of the ink at 25 degrees C. is preferably from 5 to 30 mPa·s and more preferably from 5 to 25 mPa·s because print density and text quality improve and good dischargeability is demonstrated. Viscosity can be measured by, for example, a rotatory viscometer (RE-80L, manufactured by TOKI SANGYO CO., LTD.). The measuring conditions are as follows:

Standard cone rotor (1° 34'×R24)
Sample liquid amount: 1.2 mL
Rate of rotation: 50 rotations per minute (rpm)
25 degrees C.
Measuring time: three minutes.

The surface tension of the ink is preferably 35 mN/m or less and more preferably 32 mN/m or less at 25 degrees C. because the ink suitably levels on a recording medium and the drying time of the ink is shortened.

pH of the ink is preferably from 7 to 12 and more preferably from 8 to 11 in terms of prevention of corrosion of metal parts in contact with liquid.

Recording Medium

The recording medium as substrate for use in recording is not particularly limited. Specific examples include, but are not limited to, plain paper, gloss paper, special paper, corrugated board, cloth, film, transparent sheets, and printing paper for general purposes.

As described above, soft packaging substrates such as transparent film, corrugated board, and cloth substrates such as fabric are preferable as recording media as substrate.

The printing method of the present disclosure includes a step of applying an ink to a substrate. Specific examples will be described below.

Recording Device and Recording Method

The ink of the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices such as 3D printers and additive manufacturing devices.

In the present disclosure, the recording device and the recording method respectively represent a device capable of discharging ink and liquids such as various processing liquids to a recording medium and a method of recording utilizing such a device. The recording medium means an article to which ink or various processing fluids can be temporarily or permanently attached.

The recording device may further optionally include a device relating to feeding, conveying, and ejecting a recording medium and other devices such as a pre-processing device and a post-processing device in addition to the head portion that discharges the ink.

The recording device and the recording method may further optionally include a heater for use in the heating process and a drier for use in the drying process. For example, the heating device and the drying device include devices including heating and drying the print surface of a recording medium and the opposite surface thereof. The heating device and the drying device are not particularly limited. For example, a fan heater and an infra-red heater can be used. Heating and drying can be conducted before, in the middle of, or after printing.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the liquid discharging head is caused to move and a line type device in which the liquid discharging head is not moved, unless otherwise specified.

Furthermore, in addition to the desktop type, this recording device includes a device capable of printing images on a wide recording medium such as A0 and a continuous printer capable of using continuous paper rolled up in a roll form as recording media.

Figure 2:
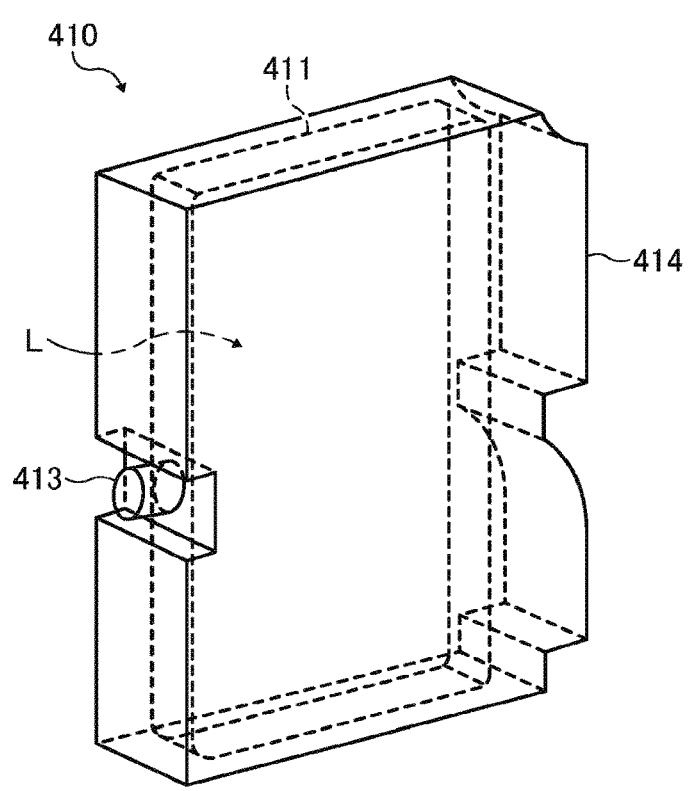
FIG. 2 is a diagram illustrating a perspective view of an example of a tank of an inkjet recording device.

The recording (print) device is described using an example with reference to FIG. 1 and FIG. 2. FIG. 1 is a diagram illustrating a perspective view of the recording device. FIG. 2 is a diagram illustrating a perspective view of a tank. An image forming apparatus 400 as an embodiment of the recording device is a serial type image forming apparatus. A mechanical unit 420 is disposed in an exterior 401 of the image forming apparatus 400. Each ink accommodating unit (ink container) 411 of each tank 410 (410k, 410c, 410m, and 410y) for each color of black (K), cyan (C), magenta (M), and yellow (Y) is made of a packaging member such as aluminum laminate film. The ink accommodating unit 411 is housed in, for example, a plastic container housing unit 414 and L represents liquid contained in the ink accommodating unit 411. As a result, the tank 410 is used as an ink cartridge of each color.

A cartridge holder 404 is disposed on the rear side of the opening when a cover 401c is opened. The cartridge holder 404 is detachably attached to the tank 410. As a result, each ink discharging outlet 413 of the tank 410 communicates with a discharging head 434 for each color via a supplying tube 436 for each color so that the ink can be discharged from the discharging head 434 to a recording medium.

This recording device may include not only a portion to discharge ink but also a device referred to as a pre-processing device and a post-processing device.

As an example of the pre-processing device and the post-processing device, like the ink of black (K), cyan (C), magenta (M), and yellow (Y) ink, the pre-processing device and the post-processing device may further include a liquid accommodating unit including a pre-processing liquid or a post-processing liquid and a liquid discharging head to discharge the pre-processing liquid or the post-processing liquid according to an inkjet printing method.

As another example of the pre-processing device and the post-processing device, it is suitable to dispose a pre-processing device and a post-processing device not employing the inkjet printing method but a blade coating method, a roll coating method, or a spray coating method.

Drying Process

The printing method of the present disclosure optionally include a drying process.

As the heating device (heater), many known heating devices can be used.

Specific examples thereof include, but are not limited to, devices for heated wind heating, radiation heating, conduction heating, or microwave drying. These can be used alone or in combination of two or more thereof.

It is preferable to determine the level of drying depending on the heat shrinking property of thickness and material of substrate.

It is preferable to adopt heated wind drying or IR drying for the drying process after the second process so that volatile components are efficiently evaporated after ink droplets reach a substrate, which enhances fixing property of an image.

Terms such as image forming, recording, printing, and print used in the present disclosure represent the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples and Comparative Examples but are not limited thereto. In Examples, parts means parts by mass and percent means percent by mass excluding those in the evaluation criteria.

Synthesis of PR269

A total of 12.5 parts of 35 percent HCL aqueous solution was added to 187.5 parts of iced water followed by stirring and the temperature was adjusted to 5 or lower degrees C. Moreover, 8 parts of 3-amino-4-methoxybenzanilide was added followed by stirring. After dissolution of 3-amino-4-methoxybenzanilide was confirmed and precipitation of hydrochloride of 3-amino-4-methoxybenzanilide were confirmed, the resulting mixture was stirred at 5 or lower degrees C. for 30 minutes.

Thereafter, 7.8 parts of 30 percent sodium nitrite aqueous solution was added followed by stirring at 5 or lower degrees C. for 60 minutes. Moreover, 0.3 parts of sulfamic was added so that nitrous acid disappeared. Moreover, 8 parts of sodium acetate and 12 parts of 90 percent acetic acid were added so that a diazonium salt cooled solution was obtained.

In addition, separately, 12 parts of N-(5-chloro-2-methoxyphenyl)-3-hydroxy-2-naphthalene carboxyamide (naphthol AS-CA) were weighed and subsequently, 150 parts of pure water and 4 parts of sodium hydroxide were added. During stirring, the resulting mixture was heated so that a solution was obtained. The resulting solution was further stirred and cooled down to 5 degrees C. to obtain a naphthol cooling solution.

The diazonium salt cooled solution was poured into a syringe pump equipped with a 0.5 mm syringe and injected to the naphthol cooling solution at a rate of 15 parts/minute under stirring at 10 or lower degrees C. followed by vigorous stirring at 1,200 rpm at 5 or lower degrees C. for one hour. Thereafter, the resulting solution was heated followed by vigorous stirring at 1,200 rpm for one hour. Moreover, pH of the resulting solution was adjusted to 6.0 using an aqueous solution of 1N hydrochloric acid or 1N sodium hydroxide followed by filtering and rinsing with water, which was dried at 80 degrees C. for 10 hours. The resulting material was pulverized so that C.I. Pigment Red 269 was obtained.

The resulting PR269 was rinsed with water repeatedly while the number of rinsing was adjusted, which was followed by drying so that PR269 A to H powders shown in Table 1 below were obtained.

TABLE 1

| | Remaining naphthol AS-CA (percent by mass/PR269) | | Remaining naphthol AS-CA (percent by mass/PR269) |
|---|---|---|---|
| PR269-A | 0.30 percent | PR269-E | 1.70 percent |
| PR269-B | 0.50 percent | PR269-F | 2.00 percent |
| PR269-C | 1.00 percent | PR269-G | 2.20 percent |
| PR269-D | 1.50 percent | PR269-H | 2.70 percent |

The amount of remaining naphthol AS-CA of each sample was measured as follows.

Each sample (0.5 g) was weighed, dried, and mixed with 10 mL of N-methyl pyrrolidone. The resulting mixture was pulverized by ultrasonic wave for 15 minutes. Thereafter, 20 ml of methanol was added followed by the pulverization for another 15 minutes followed by filtering the resulting suspension.

A total of 20 µl of the resulting filtrant was introduced into an auto sampler of HPLC system and the quantity of remaining naphthol AS-CA was determined based on the calibration curve preliminarily drawn using the naphthol AS-CA reference material and the peak area of the sample.

The measuring conditions of the HPLC system are as follows.

Instrument used: LC-20000 Plus, manufactured by JASCO Corporation

Column: Triart-C18, 4.6×100 mm

Eluent: aqueous solution of ammonium acetate/methanol

Rate of flowing: 1.0 ml/minute

Column temperature: 50 degrees C.

Detector: PDA (photodiode array)

Method of Preparing PR269 Liquid Dispersions A to H

The following recipe was pre-mixed, which was thereafter subject to circulation dispersion for 7 hours by a disk type bead mill (KDL type, media: zirconia ball having a diameter of 0.3 mm, manufactured by SHINMARU ENTERPRISES CORPORATION) so that a PR269 liquid dispersion A (concentration of pigment solid content: 15 percent by mass) was obtained.

PR269-A: 15 parts

Anionic surfactant (Pionine A-51-B, manufactured by TAKEMOTO OIL & FAT Co., Ltd.): 2 parts Deionized water: 83 parts PR269 liquid dispersions B to H were obtained in the same manner as in the preparation of PR269-A except that PR269 B to H were used instead of PR269A.

Preparation Method of Ink

Each component was mixed and stirred in the formulation in parts by mass shown in Tables 2 and 3 below followed by filtering with 0.2 μm polypropylene filter to prepare ink.

The materials shown in Tables 2 and 3 are as follows.

Surfactant: Capstone FS-34 (manufactured by Chemours K.K)

Resin emulsion A: ES-85 (acrylic resin, manufactured by Japan Coating Resin Co., Ltd.)

Resin emulsion B: VONCOAT CF-6140 (acrylic resin, manufactured by DIC Corporation)

PROXEL LV: Preservatives and fungicides, manufactured by AVECIA GROUP

TABLE 2

|  | Example 1 | Example 2 | Example 3 | Example 4 | Example 5 | Example 6 |
|---|---|---|---|---|---|---|
| PR269 liquid dispersion A (as solid content) |  |  | 7.0 |  |  |  |
| PR269 liquid dispersion B (as solid content) |  | 5.0 |  | 4.0 |  |  |
| PR269 liquid dispersion C (as solid content) | 3.0 |  |  |  | 2.5 | 7.2 |
| PR269 liquid dispersion D (as solid content) |  |  |  |  |  |  |
| PR269 liquid dispersion E (as solid content) |  |  |  |  |  |  |
| PR269 liquid dispersion F (as solid content) |  |  |  |  |  |  |
| PR269 liquid dispersion G (as solid content) |  |  |  |  |  |  |
| PR269 liquid dispersion H (as solid content) |  |  |  |  |  |  |
| Resin emulsion A (as solid content) | 5.0 | 3.5 |  |  | 5.0 | 5.0 |
| Resin emulsion B (as solid content) |  |  | 5.0 | 7.0 |  |  |
| Surfactant | 1.0 | 0.8 | 1.2 | 1.5 | 1.0 | 1.0 |
| 1,2-Propane diol | 20.0 |  | 10.0 |  | 20.0 | 20.0 |
| 1,2-Butane diol |  | 20.0 |  |  |  |  |
| 2,3-Butane diol |  |  | 10.0 | 20.0 |  |  |
| Diethylene glycol monobutyl ether | 7.0 |  |  |  | 7.0 | 7.0 |
| Diethylene glycol dimethyl ether |  |  |  | 15.0 |  |  |
| Propylene glycol mono-propyl ether |  | 3.0 |  |  |  |  |
| Propylene glycol monomethyl ether |  |  | 10.0 |  |  |  |
| PROXEL LV | 0.1 | 0.1 | 0.1 | 0.1 | 0.1 | 0.1 |
| Highly pure water | Balance | Balance | Balance | Balance | Balance | Balance |
| Total amount | 100 | 100 | 100 | 100 | 100 | 100 |

|  | Example 7 | Example 8 | Example 9 | Example 10 | Example 11 | Example 12 |
|---|---|---|---|---|---|---|
| PR269 liquid dispersion A (as solid content) |  |  |  |  |  |  |
| PR269 liquid dispersion B (as solid content) |  |  |  |  |  | 4.0 |
| PR269 liquid dispersion C (as solid content) |  |  |  | 3.0 | 3.0 |  |
| PR269 liquid dispersion D (as solid content) | 3.0 |  |  |  |  |  |
| PR269 liquid dispersion E (as solid content) |  | 4.0 |  |  |  |  |
| PR269 liquid dispersion F (as solid content) |  |  | 7.0 |  |  |  |
| PR269 liquid dispersion G (as solid content) |  |  |  |  |  |  |
| PR269 liquid dispersion H (as solid content) |  |  |  |  |  |  |
| Resin emulsion A (as solid content) |  | 5.0 |  | 5.0 | 5.0 |  |
| Resin emulsion B (as solid content) | 5.0 |  | 5.0 |  |  | 5.0 |
| Surfactant | 1.0 | 1.0 | 1.0 | 1.0 | 1.0 | 1.0 |
| 1,2-Propane diol |  | 20.0 | 10.0 | 20.0 | 20.0 |  |
| 1,2-Butane diol |  |  |  |  |  |  |

TABLE 2-continued

|  |  |  |  |  |  |  |
|---|---|---|---|---|---|---|
| 2,3-Butane diol | 20.0 |  | 10.0 |  |  |  |
| Diethylene glycol monobutyl ether | 7.0 |  |  | 2.5 | 16.0 |  |
| Diethylene glycol dimethyl ether |  | 15.0 |  |  |  | 15.2 |
| Propylene glycol mono-propyl ether |  |  |  |  |  |  |
| Propylene glycol monomethyl ether |  |  | 10.0 |  |  |  |
| PROXEL LV | 0.1 | 0.1 | 0.1 | 0.1 | 0.1 | 0.1 |
| Highly pure water | Balance | Balance | Balance | Balance | Balance | Balance |
| Total amount | 100 | 100 | 100 | 100 | 100 | 100 |

TABLE 3

|  | Comparative Example 1 | Comparative Example 2 | Comparative Example 3 | Comparative Example 4 |
|---|---|---|---|---|
| PR269 liquid dispersion A (as solid content) |  |  |  |  |
| PR269 liquid dispersion B (as solid content) |  |  |  |  |
| PR269 liquid dispersion C (as solid content) |  |  | 3.0 |  |
| PR269 liquid dispersion D (as solid content) |  |  |  |  |
| PR269 liquid dispersion E (as solid content) |  |  |  |  |
| PR269 liquid dispersion F (as solid content) |  |  |  |  |
| PR269 liquid dispersion G (as solid content) | 3.0 |  |  | 3.0 |
| PR269 liquid dispersion H (as solid content) |  | 3.0 |  |  |
| Resin emulsion A (as solid content) | 5.0 | 5.0 | 5.0 | 5.0 |
| Resin emulsion B (as solid content) |  |  |  |  |
| Surfactant | 1.0 | 1.0 | 1.0 | 1.0 |
| 1,2-Propane diol | 20.0 | 20.0 | 20.0 | 20.0 |
| 1,2-Butanediol |  |  |  |  |
| 2,3-Butane diol |  |  |  |  |
| Diethylene glycol monobutyl ether | 7.0 | 7.0 |  |  |
| Diethylene glycol dimethyl ether |  |  |  |  |
| Propylene glycol mono-propyl ether |  |  |  |  |
| Propylene glycol monomethyl ether |  |  |  |  |
| PROXEL LV | 0.1 | 0.1 | 0.1 | 0.1 |
| Highly pure water | Balance | Balance | Balance | Balance |
| Total amount | 100 | 100 | 100 | 100 |

The inks of Examples and Comparative Examples were evaluated on the following items.

Evaluation on Ink Storage Stability

An ink cartridge was filled with the prepared ink and left undone at 65 degrees C. for three weeks. Viscosity and agglomeration of the ink were evaluated according to the following evaluation criteria. B and higher grades are allowable.

Evaluation Criteria

A: Change rate of viscosity before and after storage within −10 percent to 10 percent B: Change rate of viscosity before and after storage over 10 percent to 20 percent D: Change rate of viscosity before and after storage more than 20 percent Evaluation on Solid Image Filling An inkjet printer (remodeled based on IPSiO GXe 5500, manufactured by Ricoh Co. Ltd.) filled with each ink was prepared and a solid image patch was printed on biaxial oriented polypropylene film (PYLEN® P-2161, thickness of 30 μm, manufactured by TOYOBO CO., LTD.). The solid image patch was dried in an oven at 80 degrees C. for two minutes and the dried solid image patch was subject to the solid image filling evaluation according to the following evaluation criteria. B and higher grades are allowable.

Evaluation Criteria

A: Uniform solid image was formed

B: 99 percent or more of the image was solid with very few omissions and beading C: Less than 99 percent of the image was solid with clear omissions and cracking Evaluation on Image Density An inkjet printer (remodeled based on IPSiO GXe 5500, manufactured by Ricoh Co. Ltd.) filled with each ink was prepared and a solid image patch was printed on biaxial oriented polypropylene film (PYLEN® P-2161, thickness of 30 μm, manufactured by TOYOBO CO., LTD.). The solid image patch was dried in an oven at 80 degrees C. for two minutes and the resulting dried solid image patch was subject to the solid image filling evaluation according to the following evaluation criteria. B and higher grades are allowable.

Evaluation Criteria
A: Image density of 1.5 or higher
B: Image density of 1.1 to less than 1.5
C: Image density of less than 1.1

Evaluation on Skin Sensitization Potential

The SI value was calculated according to LLNA method, which was skin sensitizing potential evaluation in OECD test guide line 429 and skin sensitizing potential was evaluated according to the following evaluation criteria. B and higher grades are allowable.

Evaluation Criteria
A: SI value is less than 1.8-fold.
B: SI value from 1.8-fold to less than 2.5-fold
C: SI value is not less than 2.5-fold The evaluation results of each ink are shown in Tables 4 and 5.

TABLE 4

|  | Example 1 | Example 2 | Example 3 | Example 4 | Example 5 | Example 6 |
| --- | --- | --- | --- | --- | --- | --- |
| Storage Stability | A | A | A | A | A | B |
| Solid image filling | A | A | A | A | A | A |
| Image Density | A | A | A | A | B | A |
| Skin sensitization | A | A | A | A | A | A |

|  | Example 7 | Example 8 | Example 9 | Example 10 | Example 11 | Example 12 |
| --- | --- | --- | --- | --- | --- | --- |
| Storage Stability | B | B | B | A | B | B |
| Solid image filling | A | A | A | B | B | B |
| Image Density | A | A | A | B | B | B |
| Skin sensitization | B | B | B | A | A | A |

TABLE 5

|  | Comparative Example 1 | Comparative Example 2 | Comparative Example 3 | Comparative Example 4 |
| --- | --- | --- | --- | --- |
| Storage stability | C | C | A | C |
| Solid image filling | A | A | C | C |
| Image density | A | A | A | A |
| Skin sensitization potential | C | C | A | C |

As seen in the results shown in Tables 4 and 5, the ink of each Example demonstrated excellent storage stability, solid image filling, image density, and skin sensitizing potential.

The solid image patch was also printed on a corrugated board instead of the biaxial oriented polypropylene (PYLEN® P-2161, thickness of 30 μm, manufactured by TOYOBO CO., LTD.). The solid image printed on the corrugated board also had high image density.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An ink comprising:

water;

a compound represented by the following Chemical formula 1;

Pigment Red 269 represented by the following Chemical formula 2; and alkylene glycol alkyl ether, wherein a proportion of the compound represented by the following Chemical formula 1 in a total amount of the Pigment Red 269 is greater than 0 percent by mass and less than 2 percent by mass

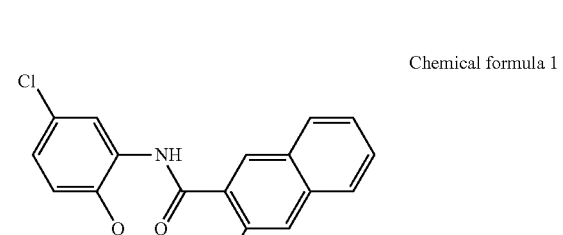

Chemical formula 1

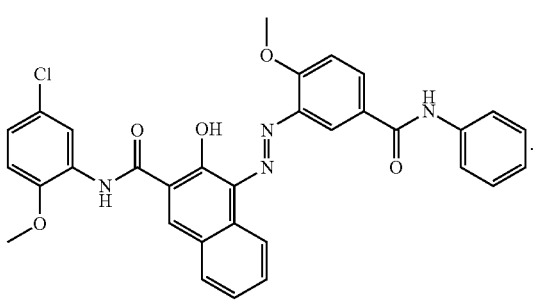

Chemical formula 2

2. The ink according to claim 1, wherein a proportion of Pigment Red 269 of a total amount of the ink is from 3 to 7 percent by mass.

3. The ink according to claim 1, wherein the proportion of the compound represented by the following Chemical formula 1 of the total amount of Pigment Red 269 is greater than 0 percent by mass and less than 1 percent by mass.

4. The ink according to claim 1, wherein a proportion of alkylene glycol alkyl ether of a total amount of the ink is from 3 to 15 percent by mass.

5. A printing method comprising:
applying the ink of claim 1 to a substrate.

6. The printing method according to claim 5, wherein the substrate comprises a soft packaging substrate.

7. The printing method according to claim 6, wherein the soft packaging substrate comprises a transparent film.

8. The printing method according to claim 5, wherein the substrate comprises cloth.

9. The printing method according to claim 5, wherein the substrate comprises a corrugated board.

10. The ink according to claim 1, wherein the Pigment Red 269 is obtained by a process comprising reacting the compound represented by Chemical formula 1 with at least one other reagent.

11. A process of making the ink according to claim 1, the process comprising:
refining the Pigment Red 269, thereby removing a portion of the compound represented by Chemical formula 1.

12. The method of claim 11, wherein the refining comprises repeated stirring and filtering with pure water, diafiltration using an ultrafiltration membrane, or refining with a Soxhlet extractor.

13. The method of claim 11, wherein the refining comprises repeated stirring and filtering with pure water.

* * * * *